No. 687,428. Patented Nov. 26, 1901.
J. O. HEINZE, Jr.
MAGNETIC MECHANICAL MOVEMENT.
(Application filed June 6, 1901.)
(No Model.) 3 Sheets—Sheet 1.

WITNESSES INVENTOR

No. 687,428. Patented Nov. 26, 1901.
J. O. HEINZE, Jr.
MAGNETIC MECHANICAL MOVEMENT.
(Application filed June 6, 1901.)
(No Model.) 3 Sheets—Sheet 2.

WITNESSES

INVENTOR

No. 687,428.  
J. O. HEINZE, Jr.  
MAGNETIC MECHANICAL MOVEMENT.  
(Application filed June 6, 1901.)

Patented Nov. 26, 1901.

(No Model.)

3 Sheets—Sheet 3.

WITNESSES  
W. E. Coveney  
Francis J. V. Dakin

INVENTOR  
John Otto Heinze Jr.  
By his attorneys  
Beach & Richardson

UNITED STATES PATENT OFFICE.

JOHN OTTO HEINZE, JR., OF REVERE, MASSACHUSETTS, ASSIGNOR OF ONE-HALF TO WILLIAM HERBERT ROLLINS, OF BOSTON, MASSACHUSETTS.

MAGNETIC MECHANICAL MOVEMENT.

SPECIFICATION forming part of Letters Patent No. 687,428, dated November 26, 1901.

Application filed June 6, 1901. Serial No. 63,392. (No model.)

*To all whom it may concern:*

Be it known that I, JOHN OTTO HEINZE, Jr., a citizen of the United States, residing at Revere, in the county of Suffolk and State of Massachusetts, have invented a certain new and useful Magnetic Mechanical Movement, of which the following is a specification, reference being had therein to the accompanying drawings.

Figure 1:
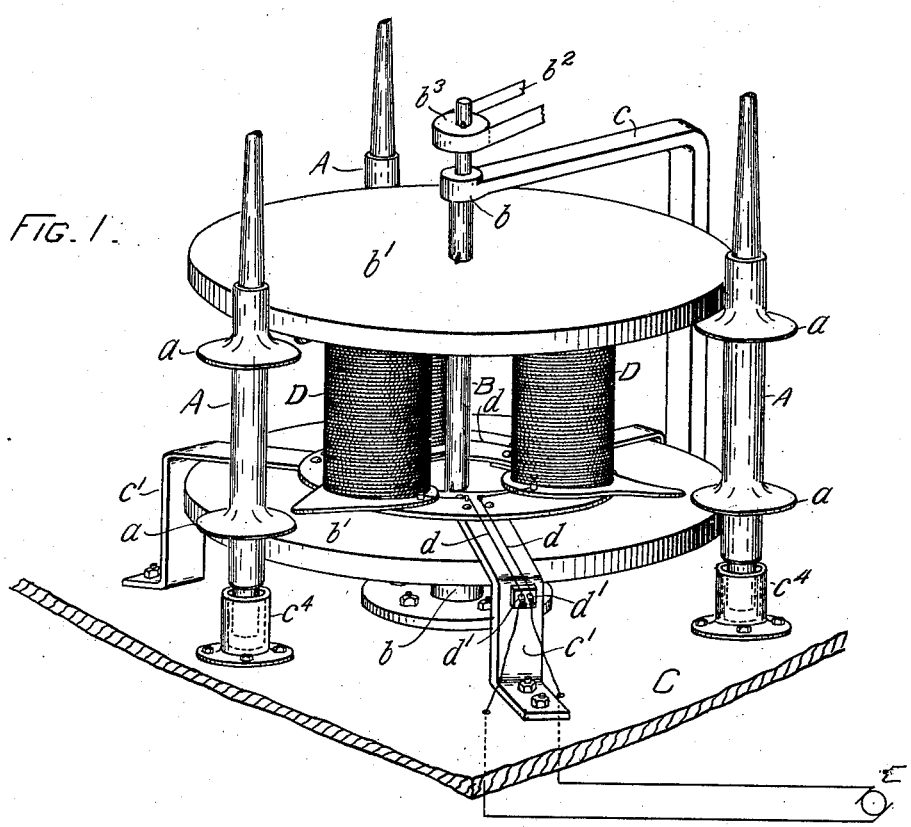
Figure 2:
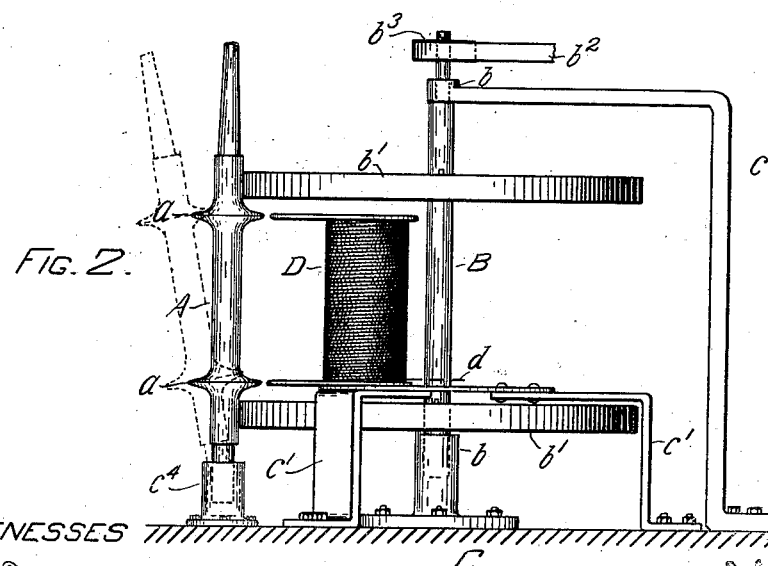

Figure 1 is an isometric view showing the preferred form of my invention. Fig. 2 is an elevation thereof, showing only one spindle and magnet of those shown in Fig. 1. Figs. 3, 4, 5, 6, and 7 show modifications of said invention.

The principal object of my invention is to provide a magnetic mechanical movement whereby a shaft, spindle, or the like may be revolved at a high rate of speed with a minimum amount of frictional resistance, and I accomplish this object by means whereby the usual contact areas of a spindle and its bearing are reduced to a single line, the spindle and bearing are in rolling as distinguished from sliding contact along said single line, and all the power and motion given to said spindle are transmitted through said line of contact.

In the drawings illustrating the principle of my invention and the best mode now known to me of embodying that principle, A represents spindles constructed of any magnetic material—such as iron, steel, or nickle—and B is a vertical shaft provided with suitable bearings $b\ b$, fixed to a base C and bracket $c$. Between said bearings $b\ b$ and fast to said shaft B are two non-magnetic circular power and bearing disks $b'\ b'$, said shaft B and its disks $b'\ b'$ receiving their rotary motion from a power-belt $b^2$ and pulley $b^3$, fast on the shaft B. Secured to base C is a bracket $c'$, that sustains electromagnets D, which lie between said bearing-disks $b'\ b'$, there being one electromagnet for each spindle A, each of said spindles A having two magnetizable disks $a\ a$, so located thereon as to be opposite to and not in contact with the poles of the electromagnet D, as clearly appears in Fig. 2. The power and bearing disks $b'\ b'$ are in rolling contact with the spindles A.

The electromagnets D are in circuit and have their terminal wires $d\ d$ secured in binding-posts $d'\ d'$, from which wires $d^2\ d^2$ lead off to any desired source of electrical energy, such as is diagrammatically shown in dynamo E.

I have now described the essential features of my invention, and the operation thereof is as follows: The power and bearing disks $b'\ b'$ having been set in motion by the belt $b^2$, the magnets D energized, and the disks $a\ a$ of the spindles A being in the field of their respective magnets, the poles of the latter, acting on said disks $a\ a$ of spindles A, draw the latter into contact with the rotating power and bearing disks $b'\ b'$, which immediately cause said spindles to roll on the peripheries of the said disks, said spndles being held in a fixed position relatively to their respective magnets and their motions being limited to that of rotation. To prevent any spindle from falling to the ground should the magnet for any reason fail to sustain the spindle, each spindle has a safety device or cup $c^4$ beneath it, into which its base portion may drop and be thereby supported, as is indicated by dotted lines in Fig. 2.

The free end portions of the spindles may be provided with any article to which rotation is to be imparted. In the preferred form of my invention (shown in Fig. 1) the spindles A are designed for use in spinning-frames, while in the modifications later to be described the spindles are shown with beveled cones and gearing and drills.

Evidently this invention is of very wide application and may be used, for example, in small and delicate mechanisms—such as are required in the arts of dentistry and goldsmithery—or where the spindles or shafts are of considerable size, such as those in a spinning-frame.

Figure 3:
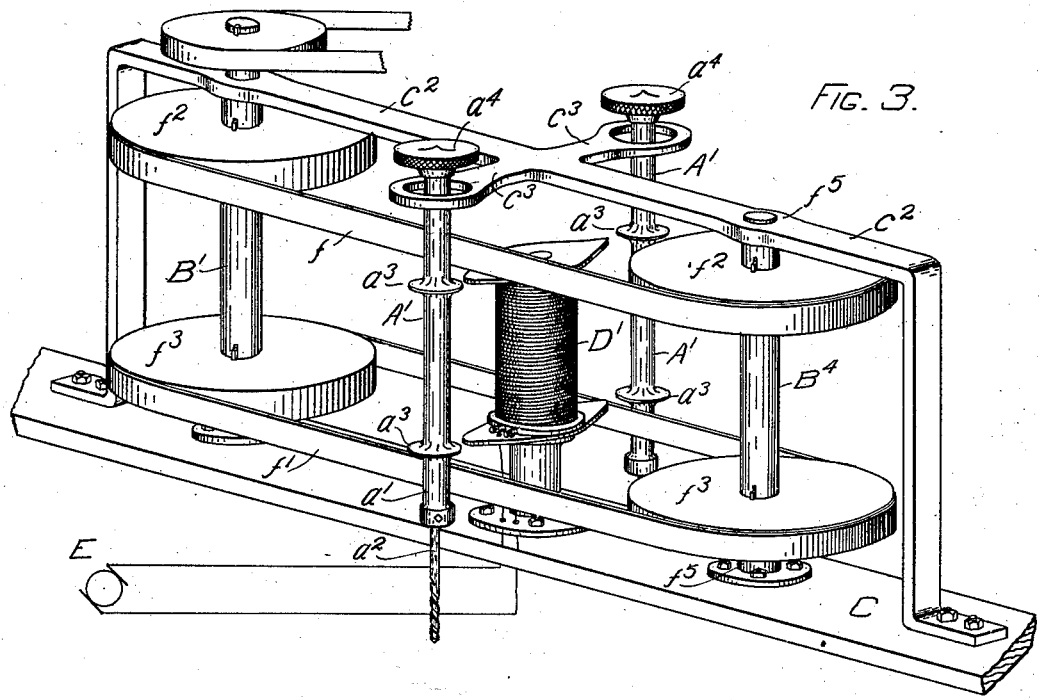

Fig. 3 shows a modification in which the moving surfaces are metallic bands $f\ f'$ instead of the above-described rotatable bearing-disks $b'\ b'$. Band $f$ is mounted on two disks $f^2\ f^2$, which are fixed, respectively, to shafts $B'\ B^4$, provided with suitable bearings $f^5$ in the base C and bracket $c^2$, while band $f'$ is mounted on disks $f^3\ f^3$, respectively mounted and fixed to said shafts $B'$ and $B^4$. A double electromagnet $D'$ is located between the advancing and retreating portions of said bands $ff'$, and the poles of said magnet are just out of contact with the disks $a^3 a^3$ on the two spindles $A'$. Each spindle is shown as provided with a stock $a'$, in which a drill $a^2$ may be socketed in the usual manner. To prevent the spindles falling away from the machine when for any reason the magnet fails to act, arms $c^3$ project from said bracket $c^2$, each of which has a hole therethrough large enough for the passage of the spindle $A'$ and its disks $a^3 a^3$, but too small to permit the passage of a collar $a^4$ at the top of said spindle. Should the spindle drop, the collar is caught by the arm $c^3$.

Figure 4:
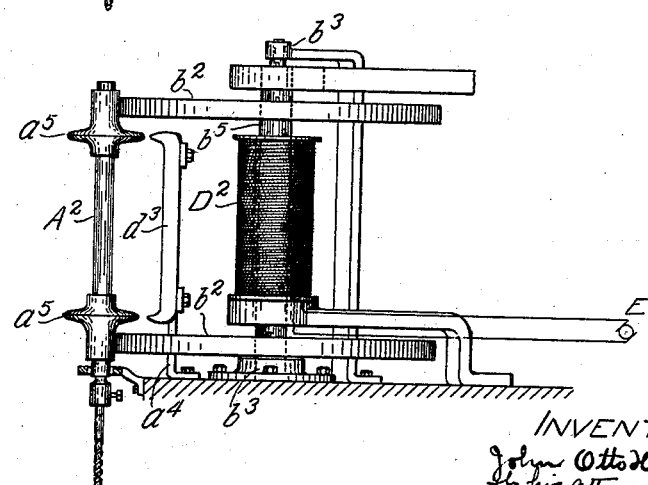

In Fig. 4 I have shown a second modified form of my invention, where the power and bearing disks $b^2 b^2$ are of magnetic material and form the poles of electromagnet $D^2$, said disks being mounted on and fixed to a shaft $b^5$, of magnetic material, having bearings, as at $b^3 b^3$. The spindle $A^2$ is non-metallic, but has thereon metallic disks $a^5 a^5$, which form a primary armature and are in rolling contact with the metallic power-disks $b^2 b^2$. Between said power-disks $b^2 b^2$ is a secondary armature $d^3$, supported by a bracket $d^4$, but out of contact with said spindle-disks $a^5 a^5$. The spindle $A^2$ is thus held against said power-disks $b^2 b^2$ and has its movements limited to that of rotation.

Figure 5:
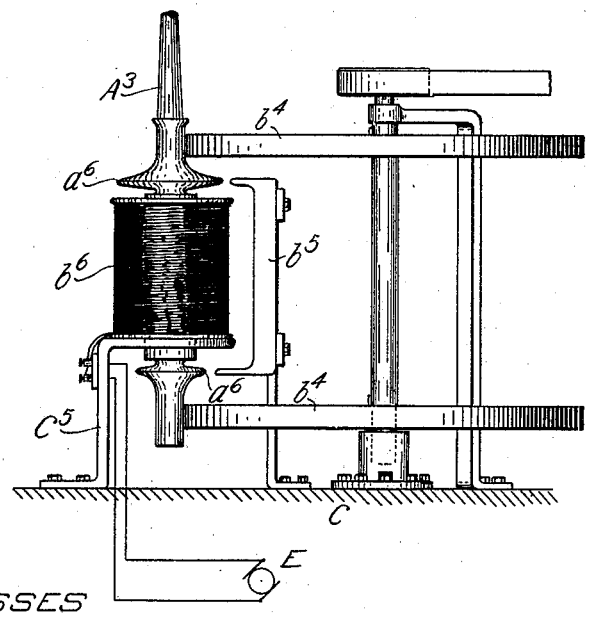

In Fig. 5 I have shown a third modification. The spindle $A^3$ is magnetizable and is magnetically held in rolling contact with the non-magnetic power and bearing disks $b^4 b^4$ by means of a magnetizable armature $b^5$ and a solenoid-coil $b^6$, whose core is formed by said spindle $A^3$, said spindle having its collars $a^6 a^6$ opposite to but not in contact with the armature $b^5$, which, with the solenoid-coil $b^6$, is supported on a bracket $d^5$, fast to the base C.

Figure 7:
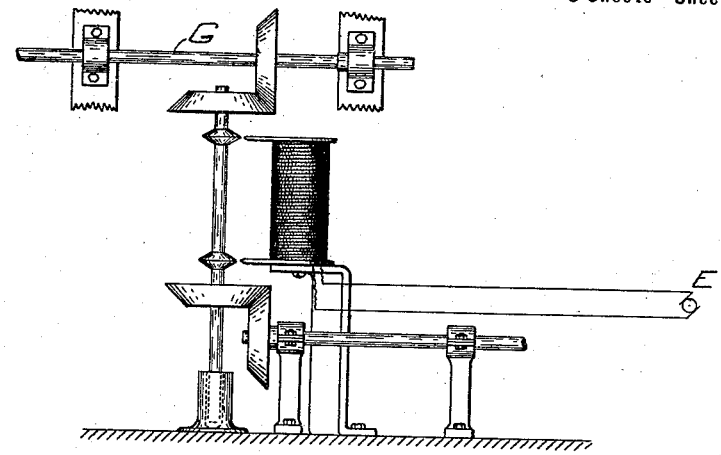
Figure 6:
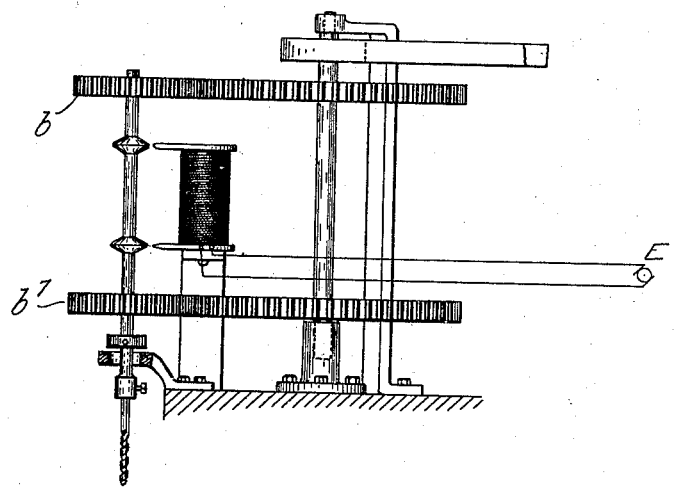

In Fig. 6 I have shown a spindle and power-disks provided with gearing $b^7 b^7$ instead of the smooth rolling surfaces shown in Figs. 1 and 2, while in Fig. 7 I have shown how a line of shafting G may be driven by power transmitted through my magnetic mechanical movement above described.

It will now be plain that any number of moving surfaces, all having either a rotary or rectilinear movement, may be used, provided that for each spindle or shaft there is a magnet so arranged as to hold its respective spindle in rolling contact with said surfaces; that the magnet may be of any desired form or construction, the term "magnet" being used in its broadest sense, and that the spindles, shafts, or the like may be of any desired number, construction, and material, provided they are under magnetic control and are thereby held in rolling contact with a moving surface or surfaces. In short, my invention may be embodied in many different forms without departing from the spirit thereof, and I wish to be understood as claiming my invention in the broadest manner legally possible.

What I claim is—

1. A magnetic mechanical movement made up of a movable surface; a shaft; and means whereby said shaft and said surface are magnetically held in rolling contact.

2. A magnetic mechanical movement made up of a movable surface; a shaft of magnetic material; and a magnet whereby said shaft and said surface are magnetically held in rolling contact.

3. A shaft of magnetic material; a movable surface of non-magnetic material, and designed to be in rolling contact with said shaft; and a magnet whose poles draw said shaft against, and into rolling contact with, said movable surface, but do not touch said shaft.

4. A shaft constructed of magnetic material; a rotatable surface of non-magnetic material, designed to be in rolling contact with, and to rotate said shaft; and a magnet whose poles draw said shaft against and into rolling contact with said rotatable surface, but do not touch said shaft.

5. A spindle constructed of magnetic material; disks of non-magnetic material and of equal diameter and mounted on a shaft having suitable bearings, said disks being designed to be in rolling contact with said spindle; a magnet whose poles draw said spindle against and into rolling contact with said disks, but do not touch said spindle; and means to rotate said disks.

6. A spindle provided with collars of magnetic material; a movable surface of non-magnetic material, and designed to be in rolling contact with said spindle; and a magnet whose poles acting through said magnetic collars on said spindle, draw said spindle against and into rolling contact with said movable surface, but do not touch said collars on said spindle.

7. A spindle provided with collars of magnetic material; disks of non-magnetic material and of equal diameter and mounted on a shaft having suitable bearings, said disks being designed to be in rolling contact with said spindle; and a magnet whose poles act through said collars on said spindle and draw said spindle against and into rolling contact with said non-magnetic disks, but do not touch said collars on said spindle.

8. A spindle provided with collars of magnetic material; two disks of non-magnetic material and of equal diameters, and mounted on a shaft having suitable bearings, said disks being designed to be in rolling contact with said spindle; and a magnet whose poles act through said collars on said spindle and draw said spindle against and into rolling contact with said non-magnetic disks, but do not touch said collars on said spindle.

9. The combination of a moving surface; a multiplicity of spindles; and means whereby said spindles and said surface are magnetically held in rolling contact.

10. The combination of movable surfaces; a multiplicity of spindles; and a series of magnets, whereby the spindles are drawn against and into rolling contact with said movable surfaces, but do not touch said spindles.

11. A magnetic mechanical movement made up of a movable surface; a shaft; means whereby said shaft and said surface are magnetically held in rolling contact; and means to sustain said shaft, should the magnet fail to support said shaft in said rolling contact.

In testimony whereof I affix my signature in presence of two witnesses.

JOHN OTTO HEINZE, JR.

Witnesses:
CHARLES F. RICHARDSON,
ALBERT A. TAFT.